United States Patent Office 3,440,185
Patented Apr. 22, 1969

3,440,185
METHOD OF MAKING POROUS STRUCTURES OF POLYVINYL CHLORIDE, COMPOSITIONS FOR USE THEREIN AND RESULTING PRODUCTS
Albert J. Hanley, Cuyahoga Falls, Ohio, assignor to The General Tire & Rubber Company, a corporation of Ohio
No Drawing. Continuation of application Ser. No. 279,310, May 9, 1963. This application Jan. 24, 1967, Ser. No. 611,473
Int. Cl. C08f 47/08; B32b 3/12
U.S. Cl. 260—2.5                                    5 Claims

ABSTRACT OF THE DISCLOSURE

Porous sheets and shaped porous structures of high permeability to air, water vapor and other gases useful as leather substitutes, filter materials, etc., are produced from aqueous dispersions of selected size particles of polyvinyl chloride and separate selected size particles of plasticizer. The dispersions are cast as a layer on a support or otherwise shaped and water is evaporated under controlled conditions to create articulated gels in the form of coherent networks of plastic particles attached together only at points of contact, but otherwise separated by air voids.

*Cross-reference to related application*

This application is a continuation-in-part of copending application Ser. No. 279,310, filed May 9, 1963, now abandoned, for "Method of Making Porous Structures of Polyvinyl Chloride, etc."

*Background of the invention*

Production of porous or cellular structures from plastic or elastomeric materials by compounding the base plastic or elastomer with blowing agents which generate or release blowing gas at elevated temperatures to form cellular or porous structures is well known.

Agents used to provide the blowing gas may take various forms. For example, finely divided solid materials which decompose at molding temperatures may be used. Likewise, volatile liquids may be employed as the blowing agents, and it is known to incorporate volatile liquids, such as water, in the plastic or elastomeric material by occluding the volatile liquid on solid particles which are in turn incorporated as ingredients in the compositions to be used in forming the cellular or porous body. At the elevated temperatures used in molding or shaping the composition, the volatile liquids contained in or on the solid particles provide a source of gas to expand the plastic or elastomeric body into the cellular structure. For example, a plastisol consisting of a physical mixture of fine particles of polyvinyl chloride and sufficient plasticizer to make a fluid paste will accept adsorbent clay to which water has been added about as readily as dry clay. In fact, there is very little apparent change in the plastisol by virtue of the water occluded by the inorganic filler. On heating such a composition, the water changes to gas at 100° C. and, if the plasticizer employed in the composition has a strong solvating action, the polyvinyl chloride will be swollen to a gel with sufficient strength to retain the water vapor produced as gas bubbles and a cellular product will be obtained. The use of water occluded by an inorganic filler as a blowing agent for polyvinyl chloride compositions is disclosed, for example, in U.S. Patent 2,960,728. A modification of this general technique is disclosed in U.S. Patent 2,946,095 in which an organic resin is employed as the solid finely divided filler with occluded water in place of an inorganic filler.

In operations of this type, both closed cell and open cell structures may be produced. The production of the cellular product depends upon the generation of small spheres of gas surrounded by a binder which is in a plastic condition weak enough to expand at the temperature of gas formation and yet strong enough to retain a cellular structure until the resinous binder is subsequently strengthened either by cooling or curing. Depending upon the heating or cooling technique, the amount of gas generated, and the thermal character of the binder, the formation and maintenance of individual cells can be controlled to give closed cells or the cells may be burst into each other or the walls partially collapsed so that the final product is open-celled.

A further modification of the general procedures described above is possible through the use of blowing agents that require high temperatures for formation of gaseous products. With this type of composition, usually the outside surface consumes its gas forming component before the inner portions of the structure so the outer surface ends up as a continuous, non-permeable film which will hold gas formed within the structure. With this type of procedure and composition, the resulting products have a cellular interior with a continuous surface or exterior and the resulting structures are not permeable.

Many types of solid blowing agents which have been used in forming cellular plastic structures are expensive and are unattractive for this reason. Also, the use of fillers or other solid materials in plastic compositions introduces an extraneous ingredient which may in many cases be undesirable, e.g., presence of fillers renders the plastic structures opaque. There is a need in the art of forming cellular structures from plastic or elastomeric compositions for methods of making cellular structures which can be free of fillers or other undissolved ingredients. Likewise, there is a need for improvements in these techniques not only to reduce costs of the operations, but also to make it possible to form films or other structures of relatively high permeability as opposed to medium or low permeability or even impermeability of the cellular structure forming procedures available heretofore.

The principal object of this invention is the provision of new methods for making cellular structures from polyvinyl chloride compositions. Further objects include:

(1) The provision of new methods of creating cellular structures from plasticized polyvinyl chloride in the form of a coherent network of gel fragments attached to each other at points of contact, but separated by voids of air presenting a discontinuous film of high permeability to the passage of air, water vapor and other fluids.

(2) The simplification of methods of forming cellular structures from plasticized polyvinyl chloride and reducing the cost of this class of product.

(3) The provision of new compositions in the form of water emulsions of plasticized polyvinyl chloride compositions for use in forming plastic cellular structures.

(4) The provision of new procedures for producing porous polyvinyl chloride coatings.

(5) The provision of new forms of cellular plasticized polyvinyl chloride.

(6) The provision of new forms of artificial suede leather.

Other objects and further scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

These objects are accomplished according to the present invention by making monolithic plastic structures having high fluid permeability by a series of procedural steps which may be generally described as follows:

(a) Forming or otherwise providing an oil-in-water emulsion or aqueous suspension containing as the dispersed phase discrete particles of polyvinyl chloride and discrete particles of plasticizer for the polyvinyl chloride, (b) Placing a mass of such emulsion or suspension upon a thermally stable substrate, (c) Heating the resulting composite at a gradual rate to a temperature between about 130° and 180° C. sufficient to form a solid plastic structure by combination of said plasticizer and said polyvinyl chloride, and (d) Recovering the resulting monolithic plastic structure formed of a coherent network of polyvinyl chloride particles which are gelled with plasticizer attached to each other at points of contact only and separated by voids of air giving a highly porous or cellular structure which is unique and pleasing in appearance and is highly permeable to air and other fluids.

Advantageously, the invention is used for creating highly permeable coatings or layers upon substrates, such as paper, woven fabrics, non-woven fabrics, films or other flexible webs, by spreading a viscous emulsion containing as discrete particles a dialkyl phthalate plasticizer and polyvinyl chloride upon the flexible web in an amount between about 10 to 300 grams per square meter of the substrate and then heating the composite to a temperature between about 130° to 180° C. at a rate which will cause the water to evaporate without forming bubbles or other detrimental characteristics in the porous plastic mass which is created upon the flexible backing by the heating step. The optimum or maximum temperatures will vary with the particular composition employed.

Advantageously, the invention is used for the production of new forms of artificial suede leather comprising a flexible backing united to a flexible coherent network of plastisol particles that is highly fluid permeable.

This invention involves the discovery that monolithic plasticized polyvinyl chloride structures can be created from multi-component emulsion or suspension systems to yield structures which are highly permeable rather than dense continuous and relatively impermeable films or other structures. Even though the particles of polyvinyl chloride and the plastisol forming plasticizer are separated in the emulsion and in a mobile state, the applicant has discovered that the plasticizer and polyvinyl chloride can be made to combine to form separated particles of gelled plasticized polyvinyl chloride which are attached together only at points of contact. Surprisingly, this partial fusion of materials into a coherent mass can be accomplished without complete collapse of the permeable network so that a porous or cellular structure is obtained in contrast to an impermeable continuous film or body. The exact mechanism by which the cellular structure is formed is not certain, but it appears that there is an initial attachment of plasticizer particles to particles of the vinyl chloride polymer which helps to stabilize the emulsion or suspension. As evaporation of water from the mass occurs, water surrounding the resin particles and plasticizer appears to release the plasticizer for combination with the polymer to create the monolithic plastic structure. Probably as this occurs, the particles of resin with plasticizer become immobilized and upon being transformed to a gel with further increase in temperature, the resin particles adhere to their neighbors at local points of contact so that a coherent structure is obtained by a point-to-point contact. This leaves a volume of voids regularly placed throughout the mass roughly equal in volume to the volume originally occupied by the water. There is no blowing or gassing as such involved in the process or any use of the blowing technique to make highly attenuated coatings. The resulting structure is coherent, but does not present a continuous surface or layer. Actually, the surface of the resulting structure is unique and pleasing in appearance and the coherent product is highly permeable in nature.

A more complete understanding of the new methods, compositions and products of this invention may be obtained by reference to the following examples. In these examples and throughout the remainder of this specification and the claims, all parts and percentages are by weight unless otherwise specified.

EXAMPLE I

An oil-in-water emulsion of polyvinyl chloride plasticizer was prepared by charging a mixing vessel containing a high speed stirrer with 81 parts of water containing 0.85 part of 28% ammonium hydroxide. In a separate container, 1.93 parts of oleic acid were dissolved in 100 parts of dioctyl phthalate and this mixture was added streamwise to the ammonium hydroxide solution while it was subjected to high speed stirring. The mixing was completed within about 15 minutes at room temperature (18° C.) producing an emulsion having a consistency and color about that of heavy cream.

With the emulsion subjected to high speed stirring, 100 parts of finely divided plastisol grade polyvinyl chloride (a commercial product manufactured and sold under the trademark "Geon 121") was added streamwise to the emulsion and stirred in. The addition of the powdered resin produced a substantial thickening of the mixture creating a mass having a semi-solid consistency which might be compared to soft butter.

The resulting composition composed of an aqueous phase having dispersed therein discrete particles of polyvinyl chloride resin and dioctyl phthalate plasticizer was spread by a doctor blade coater upon cotton sheeting in varying thicknesses between 0.005 and 0.25 inch. The coatings smoothly faced the fabric and did not saturate or penetrate the cloth to any appreciable extent regardless of the thickness of the applied coating.

The emulsion coated fabric was passed into an oven heated to a temperature of 180° C. The time of dwell of the coated fabric in the oven was about 15 minutes, during which time the water in the applied resin mixture was evaporated followed by the fusing of the plasticizer and resin particles into a coherent plastisol network.

The resulting product was a piece of cotton fabric faced with a polyvinyl chloride plastisol layer having the appearance of suede leather. The product, which could be employed as artificial suede leather, had the flexibility and other characteristics of a supple leather with the flexibility accordingly being related to the thickness of the coating of the different samples the thinner coatings providing greater flexibility than the thicker coatings. All of the resulting materials exhibited high permeability to the passage of air, water vapor and other fluids.

EXAMPLE II

The procedure of Example I was repeated except that 9.5 parts of a water-soluble acrylic polymer (an acrylic acid polymer marketed under the trademark "Acrysol GS") was added to the 81 parts of water before the emulsification of the dioctyl phthalate and oleic acid. This addition of thickening agent improved the stability of the emulsion and thickened the resulting emulsion. In other respects, the results of this modified operation were comparable to those as reported in Example I.

EXAMPLE III

The procedure of Example I was repeated with the exception that instead of mixing 100 parts of dried powdered polyvinyl chloride into the dioctyl phthalate emulsion, 200 parts of an aqueous emulsion containing 100 parts of polyvinyl chloride as the disperse phase was mixed with the plasticizer emulsion. The polyvinyl chloride emulsion was a commercial product which allegedly had been prepared by so-called emulsion polymerization of vinyl chloride.

The coated fabric which was obtained in this example was highly permeable to air and other gases and vapors, although less permeable than the coated products of Example I, particularly to liquids. This was demonstrated by the fact that samples of coated fabric of this example having a plastic layer of the same thickness as samples of coated fabric of Example I required more time for the same amount of water to be forced through a given area of the coated fabric under a given hydraulic pressure as compared with the fabric of Example I. Also, the appearance and texture of the surface of coated fabric prepared in this example could be described as somewhat finer than the fabrics produced in Example I.

The art of making and using polyvinyl chloride plastics is highly developed and there is contemplated for use in accordance with this invention any of the vinyl chloride polymers and any of the plasticizers known to be useful in the art of plasticized polyvinyl chloride manufacture. This would include solid plasticizers which could be prepared in the form of an aqueous suspension by the use of ball mills, colloid mills or similar devices known in the art to be useful in forming stable aqueous suspensions of materials. In addition to dialkyl phthalates, e.g., dioctyl phthalate, phosphoric acid esters, e.g., tricresyl phosphate, may advantageously be used in the formation of the coherent permeable polymer structures.

Vinyl chloride polymers which may be employed include the homopolymers as well as copolymers of vinyl chloride with the vinyl esters, vinylidene halides, olefins, acrylic acid esters and the like. Examples of vinyl chloride polymers as well as plasticizers that may be employed in the present invention can be found in numerous publications, e.g., the aforementioned Patents 2,946,095 and 2,960,728, plus U.S. Patents Re. 22,812; 2,371,868; 2,777,824 and 2,864,777.

The proportion of plasticizer to vinyl chloride polymer will be varied as is known in the art depending in part upon the activity of the plasticizer and the molecular weight of the vinyl chloride polymer. Advantageously, about 50 to 200 parts of plasticizer are used for each 100 parts of vinyl chloride polymer.

Dyes, pigments and other coloring agents, as well as fillers, may be incorporated in the coating compositions to vary the ornamental appearance of the resulting coated fabric. Such colorants and fillers may be included in the compositions in various ways. For example, if a dry powdered vinyl chloride polymer is used, the dye or other colorant can be mixed with the polymer before the formation of the powder. On the other hand, the colorant may be mixed with the plasticizer before emulsification or the colorant may be suspended separately in the emulsion. Dyes typically are used in about 0.01 to 5% of the vinyl chloride polymer and pigments or fillers in about 1 to 25% of the polymer.

Salts of fatty acids containing 12 to 18 carbon atoms are advantageously used as emulsifying agents for the new emulsions. Preferably salts of ammonium or amines, e.g., ethylamine, and imides, e.g., morpholine, that have a boiling point less than 150° C. are used to insure water insensitivity in the final product. Other surfactants known to be useful for emulsifying oils or esters may be used, e.g., such preferred salts of alkyl aryl sulfonic acids, alkyl aryl polyether alcohols and comparable surfactants.

Stabilizers, antioxidants, fungicides, bactericides and other reagents may be employed to stabilize the plastifoam against deterioration or create biocidal artificial leather or other plastisol structures. Such modifying agents will be employed in an effective amount usually between about 0.1 and 10% by weight based upon the weight of the vinyl chloride polymer.

The proportion of water to disperse phase in the new emulsions or suspensions can be varied. This proportion will generally control the viscosity or consistency of the polymer composition although, as indicated, this may be modified by the addition of thickening or stabilizing agents. Advantageously, the emulsion or suspension will comprise between about 50 to 150 parts of vinyl chloride polymer per 100 parts of water or aqueous phase and this in turn will govern the quantity of plasticizer also present in the composition as explained above.

The thickening agents used to modify viscosity and improve emulsion stability are hydrophilic polymers having gel-forming properties with water. Useable materials include the hydrophilic acrylic acid polymers, partially hydrolyzed vinyl esters, polyvinyl alcohol, cellulose ethers, acrylamide polymers and similar water-soluble gel-forming polymers. Such agents are advantageously used in an amount between about 1 to 20 parts per 100 parts of water in the vinyl chloride emulsions or suspensions.

Any suitable form of substrate which will not be deteriorated by the heating used to evaporate the water and convert the composition into a plastisol can be used. For example, a flexible metal sheet or a metal mold may be used if it is desired to form the final porous plastisol as an unsupported film or molded body. Advantageously however, the vinyl chloride polymer composition will be applied to a flexible web which will serve as a supporting backing to be permanently connected to the coherent permeable coating. Such supporting backings may be paper, non-woven fabrics, woven fabrics or the like made of natural or synthetic fibers and including fabrics formed of metal wire. If desired, the surface of the flexible supporting backing may be treated with a primer coating before the application of the vinyl chloride polymer emulsion or suspension, e.g., a blend of between 1–20% vinyl chloride and vinyl acetate copolymer with 80–90% of styrene-acrylonitrile elastomer applied in an amount about 5% to 25% the amount of the final plastifoam layer.

The amount of coating composition applied to a flexible backing may be varied and will depend upon the thickness of the porous layer which it is desired to obtain. Advantageously, between about 10 to 300 grams of the coating material will be applied per square meter of the backing web to give coatings which have a thickness between about 1 mm. to 1 cm.

Any suitable type of coating or molding apparatus may be employed in the spreading or application of the polymer emulsions or suspensions to a backing web or other substrate. This includes roller coaters, doctor blade coaters, knife coaters, calendering equipment, spraying devices and other coating or molding equipment. Similarly, the heating of the layer or shaped body of the emulsion or suspension may be carried out with conventional heating equipment which includes hot air ovens, induction heating devices, infrared heaters or the like. Advantageously, evaporation of the water and final gelling of the vinyl polymer to form the plastisol is carried out at a temperature between about 130° to 180° C. This heating is typically controlled to cause the aqueous polymer mass to gradually rise in temperature so that there will be no adverse formation of bubbles, fissures or the like. Normally a period of about 1 to 30 minutes and advantageously, 5 to 15 minutes is used, the length of time employed generally being longer for the thicker coatings.

The invention as described above makes possible the production of new forms of monolithic structures of polyvinyl chloride plastisols formed of a coherent network of individual fragments or particles of gelled polymer. These structures, either as the supported layers upon backings or as unsupported films or articles may be employed for any purpose for which cellular or porous webs or bodies are known to be useful. One important use for the new products is as a substitute for suede leather. Other uses include filter elements, seat covers and wearing apparel.

The embodiments of the invention in which exclusive property or right is claimed are defined as follows:

1. A method of making monolithic porous plastic structures having high fluid permeability which comprises:
   (A) providing an aqueous dispersion containing:
      (a) a disperse phase consisting essentially of discrete particles of vinyl chloride polymer and separate discrete particles of plasticizer for said polymer, there being between 50 and 200 parts of placticizer particles for each 100 parts of polymer particles, and
      (b) a continuous aqueous phase amounting to 100 parts for each 50 to 150 parts of polymer particles, and
   (B) spreading a layer of said dispersion upon a thermally stable substrate in an amount between about 10 to 300 grams of dispersion per square meter of substrate surface,
   (C) heating the dispersion at a gradual rate to a temperature between about 130 and 180° C. sufficient to form an articulated gel by combination of said plasticizer particles and said polymer particles in the form of a coherent network of plastic particles attached together only at points of contact otherwise separated by air voids, and
   (D) recovering the resulting monolithic structure.

2. A method as claimed in claim 1 wherein said stable substrate is a fibrous textile.

3. A method as claimed in claim 1 wherein said substrate is a fabric and said dispersion is spread thereon at a thickness between 0.005 and 0.25 inch.

4. A method as claimed in claim 1 wherein the resulting structure is a sheet of simulated leather.

5. A method as claimed in claim 1 wherein there is added to the dispersion in step (A) between about 1 to 20 parts of a water-soluble polymer material to increase the viscosity and improve the stability of the dispersion.

References Cited

UNITED STATES PATENTS

| | | | |
|---|---|---|---|
| 3,041,193 | 6/1962 | Hamway et al. | 260—2.5 |
| 2,864,777 | 12/1958 | Greenhoe | 260—2.5 |
| 3,186,889 | 6/1965 | Boldrini et al. | 260—2.5 |

FOREIGN PATENTS 847,504   9/1960   Great Britain.

SAMUEL H. BLECH, *Primary Examiner.*

H. ROBERTS, *Assistant Examiner.*

U.S. Cl. X.R.

260—29.6; 117—76, 161, 132, 143, 155